United States Patent [19]

Jänker

(10) Patent No.: US 6,474,184 B2
(45) Date of Patent: Nov. 5, 2002

(54) TILT AND SWIVEL POSITIONING DEVICE

(75) Inventor: Peter Jänker, Garching (DE)

(73) Assignee: Eads Deutschland GmbH, Munich (DE)

( * ) Notice: Subject to any disclaimer, the term of this patent is extended or adjusted under 35 U.S.C. 154(b) by 0 days.

(21) Appl. No.: 09/865,244

(22) Filed: May 25, 2001

(65) Prior Publication Data

US 2002/0021964 A1 Feb. 21, 2002

(30) Foreign Application Priority Data

May 25, 2000 (DE) .......................... 100 26 018

(51) Int. Cl.[7] ............................................... B64C 27/46
(52) U.S. Cl. .......................... 74/99 R; 384/3; 384/154; 244/213; 416/23
(58) Field of Search .................. 74/99 R; 403/124, 403/213, 214, 215, 219; 416/23, 24; 384/2, 3, 154, 156

(56) References Cited

U.S. PATENT DOCUMENTS

| 594,492 | A | * | 11/1897 | Skiles | 384/2 |
| 2,055,928 | A | * | 9/1936 | Hays | 244/215 |
| 2,092,180 | A | * | 9/1937 | Porter | 384/154 |
| 2,786,361 | A | * | 3/1957 | Russell | 74/99 R |
| 2,852,209 | A | * | 9/1958 | Petre | 244/213 |
| 4,475,702 | A | | 10/1984 | Cole | |
| 5,387,083 | A | | 2/1995 | Larson et al. | |
| 5,409,183 | A | | 4/1995 | Gunsallus | |
| 5,639,215 | A | | 6/1997 | Yamakawa et al. | |
| 5,839,700 | A | * | 11/1998 | Nedderman | 114/127 |

* cited by examiner

Primary Examiner—William C Joyce
(74) Attorney, Agent, or Firm—Collard & Roe, P.C.

(57) ABSTRACT

A tilt and swivel positioning device for positioning a servo flap in a rotor blade. The device contains a tilt element and a bearing element. The tilt element is swivellably attached to the bearing element. The bearing arrangement has a convex roll-off surface resting against a concave roll-off surface. The radius of the concave roll-off surface exceeds the radius of the convex roll-off surface.

15 Claims, 4 Drawing Sheets

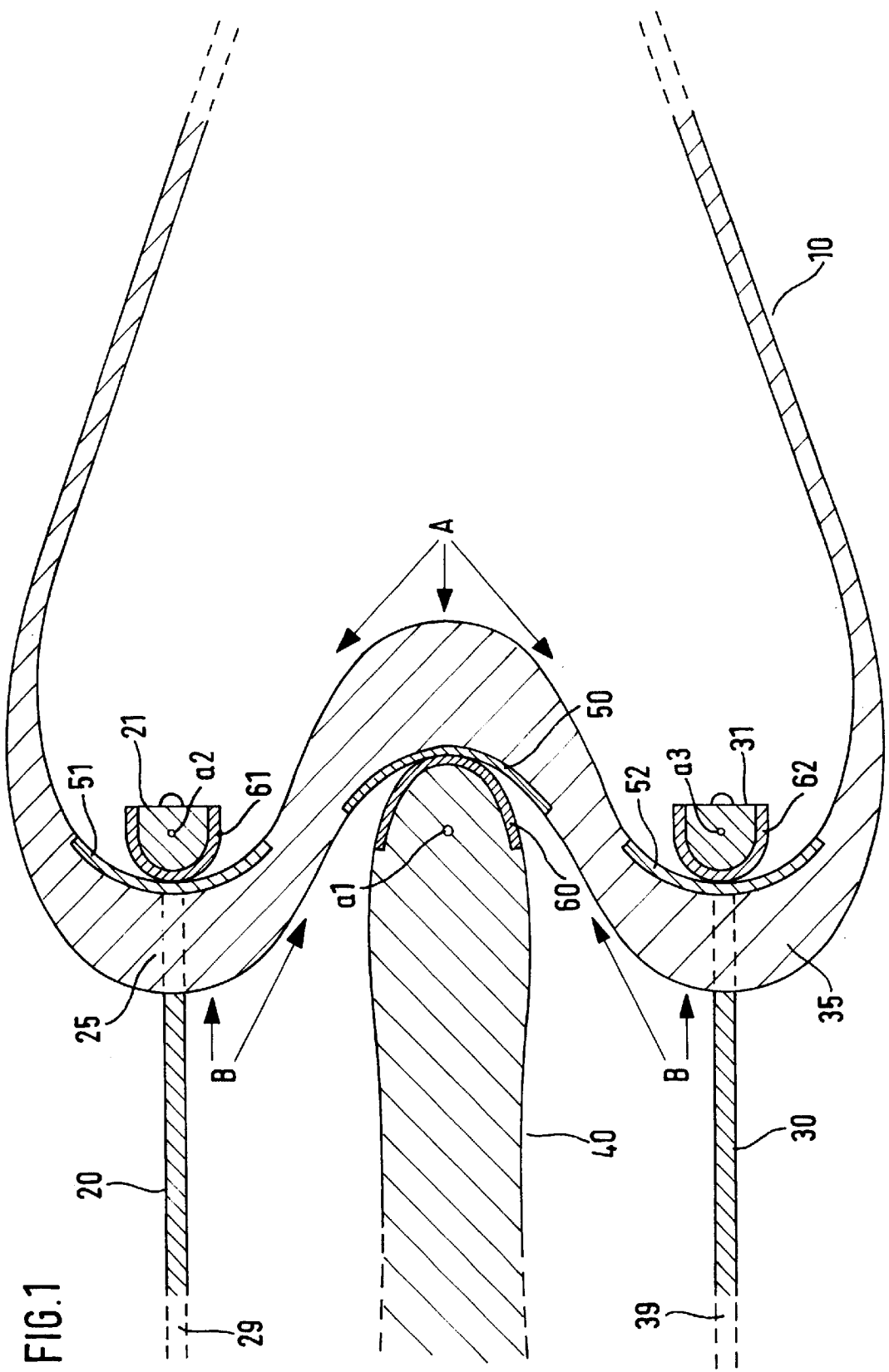

TILT AND SWIVEL POSITIONING DEVICE

BACKGROUND OF THE INVENTION

1. Field of the Invention

The invention relates to a tilt and swivel positioning device for positioning a servo flap in a rotor blade. The device contains a tilt element and a bearing element in which the tilt element swivels about the bearing element.

2. The Prior Art

Tilt and swivel positioning devices are used for spatial positioning of components relative to other components by tilting or swivelling movements about a swivel axis. Usually, the component is connected to the other components via a tilt or swivel joint. Furthermore, drive means or retention means are required to set the respective desired position of the component in relation to the other component.

Known tilt and swivel positioning devices include prestressed crank mechanisms having slide bearings or roller bearings. However, the crank-mechanisms are associated with relatively high friction losses. In addition, a change in friction forces in the dead center of movement occurs, (the so-called stick slip) making exact control of the movement sequence difficult. For some applications, roller bearings are too large or their capacity to withstand mechanical load is insufficient.

These disadvantages are significant when using tilt and swivel positioning devices for positioning a servo flap in a rotor blade of a helicopter. The servo flaps make it possible to vary the shape of a rotor blade to reduce aircraft noise and vibrations. Furthermore, the aerodynamics of the rotor blade can be improved. These servo flaps and bearings are also be subjected to considerable mechanical loads. In addition, the available design space is relatively small.

Tilt and swivel positioning devices for positioning a servo flap in a rotor blade of a helicopter are described in U.S. Pat. Nos. 5,639,215, 5,387,083 and 5,409,183. These tilt and swivel positioning devices contain the above-mentioned disadvantages.

SUMMARY OF THE INVENTION

Therefore, it is an object of the present invention to provide an improved tilt and swivel positioning means.

This and other objects are accomplished by providing a tilt and swivel positioning device for positioning a servo flap in a rotor blade. The device contains a tilt element and a bearing element. The tilt element swivels about the bearing element. The bearing element comprises a convex roll-off surface held against a concave roll-off surface. The radius of the concave roll-off surface exceeds the radius of the convex roll-off surface.

Instead of crank bearings or roller bearings, there is the interaction of two roll-off surfaces. In this way, transmission of considerable forces and a highly rigid construction, even in a confined design space, is provided. The present invention also allows essentially play-free conversion of linear movement to tilting or rotational movement with little friction loss. The use of the present device for positioning the servo flap provides fast control of the aerodynamics for each individual blade, with tracking, vibration reduction, noise reduction and stall control. Overall, the aerodynamic performance is improved.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 1 shows a cross-sectional view of the device according to the invention;

DETAILED DESCRIPTION OF THE PREFERRED EMBODIMENT

Figure 2A:
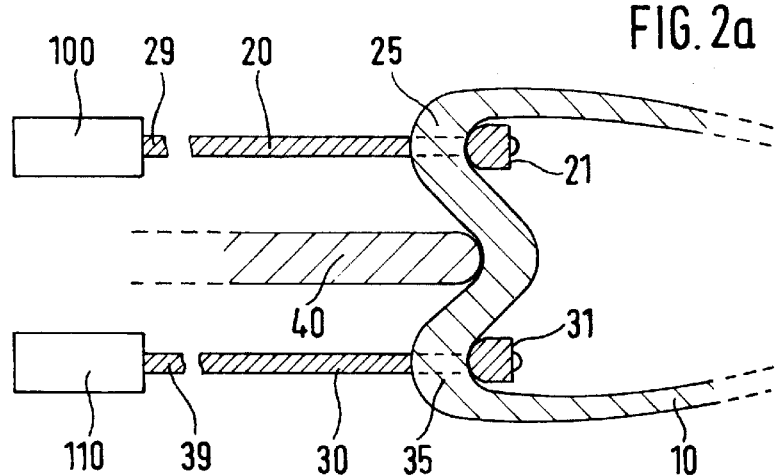
FIGS. 2a–c show cross-sectional views of another embodiment according to the invention, showing three different settings.

Referring now in detail to the drawings and, in particular, FIG. 1 shows a partial cross-sectional view of a rotor blade having a tilt and swivel positioning device for positioning a tilt element 10 in relation to a bearing element 40.

The cross-section of tilt element 10 is substantially heart-shaped on one end and comprises an outwardly concave section between two outwardly convex sections. However, as shown only in FIG. 4, tilt element 10 tapers off to a point. For ease of description, this heart shape is shown in all figures to be uniformly pointing to one side, with the outwardly convex regions and the outwardly concave region being situated on the left while the point is situated on the right. Consequently, the outwardly convex regions (left) are situated one on top of the other, so that the top and bottom directions are defined accordingly. With all interactive convex and concave roll-off surfaces, kinematic reversal is possible as well, i.e. on the respective component with a described convex roll-off surface. However, the corresponding concave roll-off surface may be provided and vice-versa.

The longitudinal extension of tilt element 10 is cylindrical, i.e. the longitudinal cross-section remains essentially the same. In addition, tilt element 10 is hollow and has a varying cross-sectional wall thickness. In particular, the convex and concave regions are designed to be stronger than the remaining areas because they are subject to greater loads.

The outer surface in the outwardly concave area forms an outer concave roll-off surface 50 for a middle convex roll-off surface 60 of bearing element 40. The radius of outer concave roll-off surface 50 exceeds that of middle convex roll-off surface 60. Roll-off surfaces 50, 60 are respectively formed surface sections. A special coating or hardening on the surface of these regions may also be provided. By increasing the hardness, wearing is reduced. By providing a low-friction design, by use of chromium-plating, friction losses in the event sliding movement occurs, can be reduced.

Tilt element 10 and bearing element 40 are arranged such that middle convex roll-off surface 60 of bearing element 40, and outer concave roll-off surface 50 of tilt element 10 maintain contact with each other. Bearing element 40, in the region of middle convex roll-off surface 60, along the same first axis a1 as tilt element 10, is cylindrically shaped, so that contact occurs along the full length of elements 10, 40 parallel to axis a1. In this way, tilt and swivel movements are essentially free of any play.

Because tilt element 10 is hollow, an outer surface region B and an inner surface region A is provided. Outer concave roll-off surface 50 is formed in the outer surface region B.

Above and below the interior of outer concave roll-off surface 50, the following are provided: the outward bulging sections of the heart shaped tilt element 10 (and thus in the interior surface region A of tilt element 10), and an upper and a lower inner concave roll-off surface 51 and 52. Upper inner concave roll-off surface 51 is in contact with an upper convex roll-off surface 61 of an upper push element 21. Lower inner concave roll-off surface 52 is in corresponding contact with a lower convex roll-off surface 62 of a lower push element 31. The radius of concave roll-off surfaces 51 and 52 exceeds that of convex roll-off surfaces 61 and 62.

Push elements 21 and 31 are arranged in the interior of hollow tilt element 10, and are designed to be cylindrical along a second axis a2 or a third axis a3. These axes are parallel to first axis a1 of tilt element 10 so that contact takes place along the entire length.

Each of push elements 21 and 31 is connected to an upper and lower pull element 20 and 30. Upper and lower pull elements 20 and 30 penetrate the mantle of tilt element 10 at an upper and lower opening 25 and 35. As shown in more detail in FIG. 4, openings 25 and 35 are slots which extend from top to bottom in their longitudinal direction are larger than the circumference of pull elements 20, 30. Consequently, it is possible to move tilt element 10 without tilting pull elements 20 and 30 horizontally or without sliding them along the vertical.

Figure 2B:
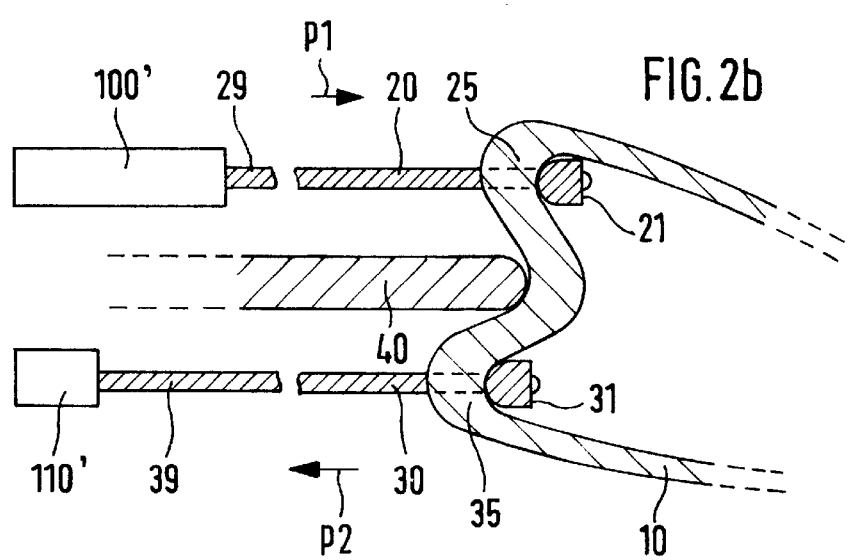
Figure 2C:
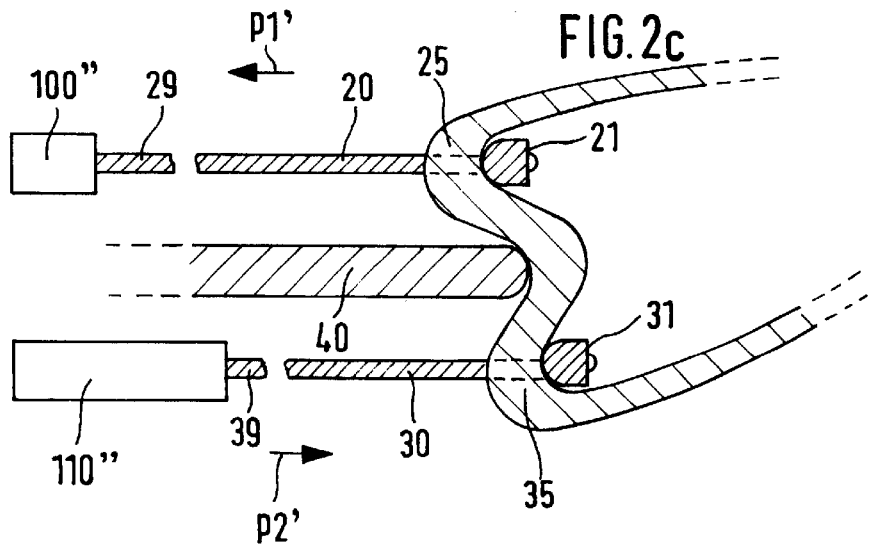

FIGS. 2a–2c shows the operation of an embodiment of the invention showing several settings of the tilt and swivel positioning device. In each instance, outer ends 29 and 39 of pull elements 20 and 30 are connected with piezoelectric actuators 100 and 110.

Piezoelectric actuators 100, 110 are ceramic elements, which change their length essentially proportional to an electrical voltage present at the elements. As a rule, such actuators comprise a multiple number of interconnected piezoceramic layers. The length changes in the direction of the layer so that the changes in length of the individual layers add up. Consequently, such piezoelectric actuators are well-suited to pushing, but in the case of tension loads there is a danger that individual layers will be torn apart. In the present case, the actuators are used under a tension load. To this effect, the use of piezoelectric actuators with a transmission mechanism and a bias spring, as described in German Patent Application 197 39 594 A1, which is hereby incorporated by reference, is advantageous.

In FIG. 2a, the same electrical voltage ($U_1=U_2$) is present at both piezoelectric actuators 100 and 110, so that their length is the same. Consequently, tilt element 10 is in a middle position, aligned horizontally. The middle position corresponds to the middle electrical voltage which is maximally applied to the actuators, so that the following applies: $U_1+U_2=U_{max}$ and $U_1=U_2=U_{max}/2$.

In FIG. 2b, upper piezoelectric actuator 100' is lengthened by an increased voltage while a lower actuator 110' is correspondingly shortened by a lower voltage. If actuators 100' and 110' starting from the state shown in FIG. 2a are set accordingly, then the actuators are controlled differentially, i.e., the change in voltage on one actuator $\Delta U_1$ has the same amount but the reversed sign as the change in voltage $\Delta U_2$ on the other actuator: $\Delta U_1=-\Delta U_2$ (thus the following applies: the sum of both voltages $U_1$, $U_2$ equals the maximum voltage $U_{max}$ which can be applied to an actuator: $U_1+U_2=U_{max}$). As a result, the lower, outwardly convex region of heart-shaped tilt element 10 is pulled to the left, while at the same time the upper, outwardly convex region of heart-shaped tilt element 10 is moved to the right. Consequently, tilt element 10 is tilted downward. As a result, two antiparallel linear movements are converted into a tilt or swivel movement.

In FIG. 2c, a lower piezoelectric actuator 100'' is lengthened by an increased voltage while an upper actuator 110'' is correspondingly shortened by a lower voltage. Consequently, tilt element 10 is tilted upward. To reach the state shown in FIG. 2C, starting from the state shown in FIG. 2a or FIG. 2b, the upper, outwardly convex region of the heart-shaped tilt element 10 is pulled to the left, while at the same time the lower, outwardly convex region of the heart-shaped tilt element 10 is moved to the right. Consequently, two antiparallel, linear movements are converted into a tilt or swivel movement.

Figure 3A:
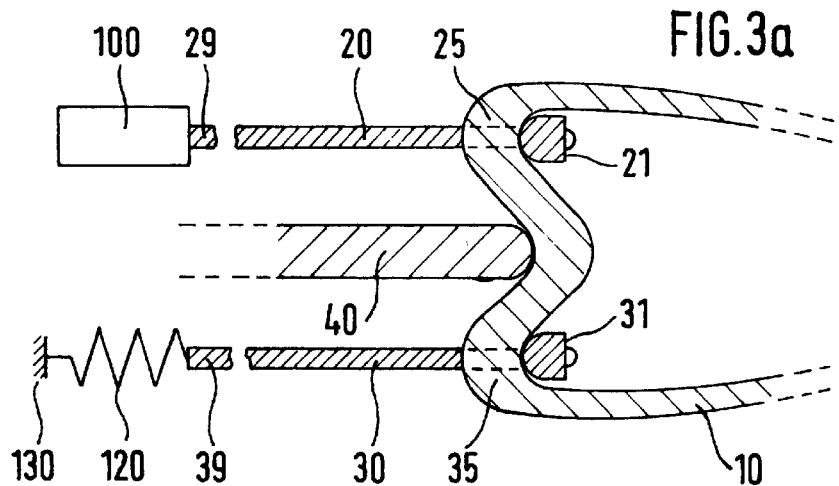
FIGS. 3a–c show cross-sectional views of a third embodiment according to the invention, also showing three different settings.
Figure 3B:
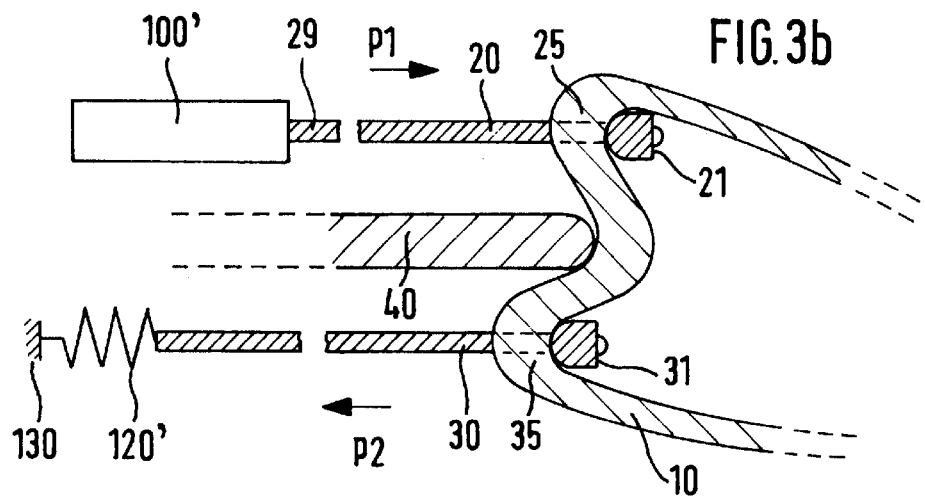
Figure 3C:
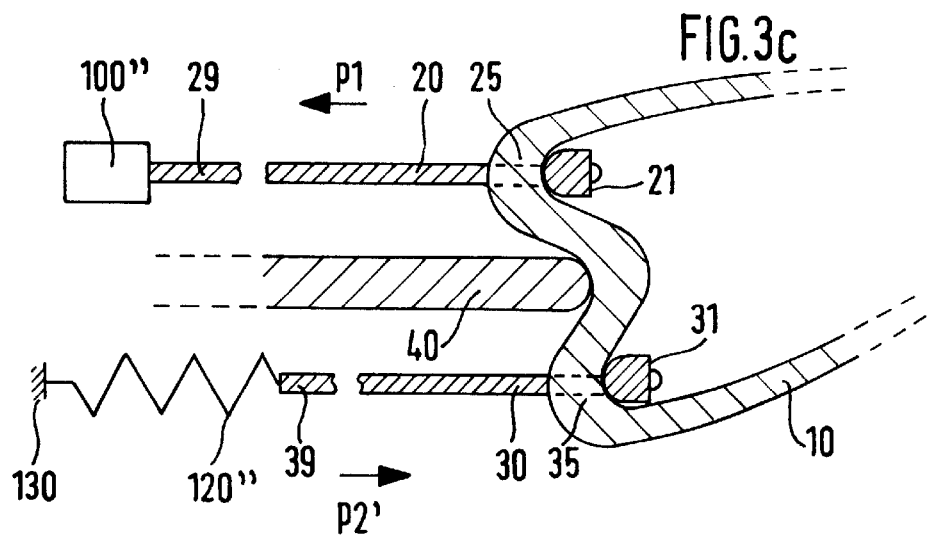

FIGS. 3a–3c show the operation of another embodiment. Only outer end 29 of upper pull element 20 is connected to piezoelectric actuator 100. By contrast, outer end 39 of lower pull element 30 is connected to a tension spring 120 which is attached to a wall or a frame 130.

In FIG. 3a, a medium voltage is present at piezoelectric actuator 100, so that tension spring 120 and actuator 100 are equal in length. Consequently, tilt element 10 is in a middle position, aligned horizontally. Since only the resulting total length of pull element 20 and 30 and actuator 100 or tension spring 120 matters, it is possible that tension spring 120 in this position is different in length from the actuator, and that pull elements 20 and 30 differ accordingly in length.

In FIG. 3b, upper piezoelectric actuator 100' is lengthened as a result of increased voltage, while tension spring 120 is correspondingly contracted. As a result, tilt element 10 is tilted downward. To get from the state shown in FIG. 3a to the state shown in FIG. 3b, the lower outwardly convex region of the hearth-shaped tilt element 10 is pulled to the left, while at the same time the upper, outwardly convex region of the heart-shaped tilt element 10 is moved to the right. As a result, two antiparallel linear movements are converted to a tilt or swivel movement.

In FIG. 3c, upper piezoelectric actuator 100'' is shortened by a reduced voltage while tension spring 120 is extended accordingly. Consequently, tilt element 10 is tilted upward. To get from the state shown in FIG. 3a or FIG. 3b to the state shown in FIG. 3c, the upper outwardly convex region of the heart-shaped tilt element 10 is pulled to the left, while at the same time the lower outwardly convex region of the heart-shaped tilt element 10 is moved to the right. As a result, two antiparallel linear movements are converted to a tilt or swivel movement.

Figure 4:
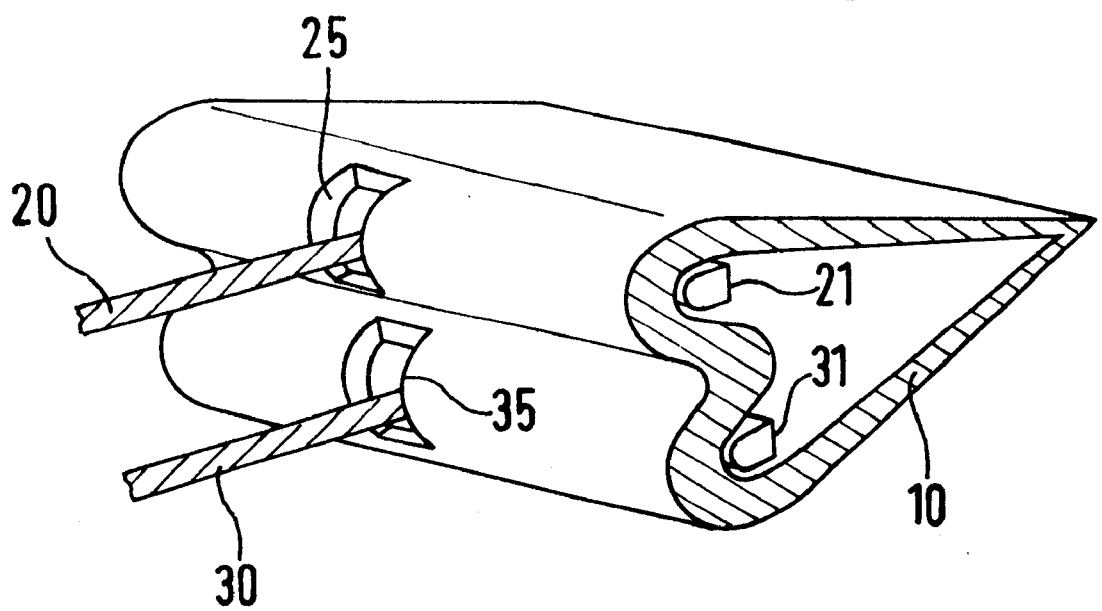
FIG. 4 shows a perspective view of the tilt element of the embodiments in FIGS. 1–3c.

FIG. 4 shows a perspective view of tilt element 10 of one of the embodiments in FIGS. 1–3c. This view shows the design of upper and lower openings 25 and 35 through which upper and lower pull elements 20 and 30 penetrate the mantle of tilt element 10. Openings 25 and 35 are slots that extend from top to bottom and in the longitudinal direction are larger than the circumference of pull elements 20, 30. Consequently, it is possible to move tilt element 10 without tilting pull elements 20 and 30 horizontally or without sliding them along the vertical.

Figure 5:
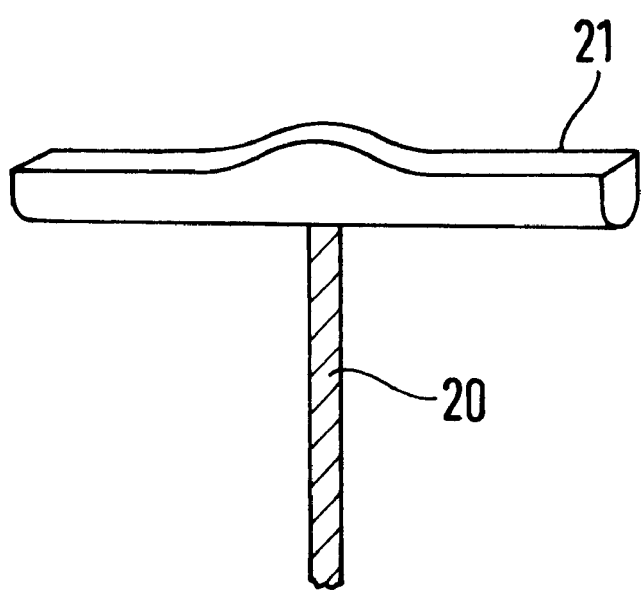
FIG. 5 shows a perspective view of the end of a pull element with a push element.

FIG. 5 shows a perspective view of the end of pull element 20 with push element 21. In the region which is connected to pull element 20, push element 21 is reinforced due to the greater forces experienced.

An alternative to the embodiment shown in FIG. 1 is to design outer roll-off surface 50 of tilt element 10 so that it is convex and design middle roll-off surface 60 of bearing element 40 so that it is concave. The same applies to the remaining pairs of roll-off surface.

As an alternative to the piezoelectric actuators shown in FIGS. 2a–2c and 3a–3c, servomotors may be used. For example, it is possible to provide a toothed rack at pull elements 20 and 30 having gearwheels coupled to the servomotors for engaging the toothed racks, or it is possible to use traction cables.

Accordingly, while only a few embodiments of the present invention have been shown and described, it is obvious that many changes and modifications may be made thereunto without departing from the spirit and scope of the invention.

What is claimed is:

1. A rotor blade comprising a tilt and swivel positioning device for positioning a servo flap; the tilt and swivel positioning device having
    a bearing element; and
    a tilt element attached to the bearing element such that it swivels;
    wherein one of the bearing element and tilt element comprises a convex roll-off surface and the other of the bearing element and tilt element comprises a concave roll-off surface, and wherein a radius of the concave roll-off surface is larger than a radius of the convex roll-off surface.

2. The tilt and swivel positioning device according to claim 1, wherein the tilt element comprises the concave roll-off surface, and the bearing element comprises the convex roll-off surface.

3. The tilt and swivel positioning device according to claim 1, wherein the tilt element comprises the convex roll-off surface, and bearing element comprises the concave roll-off surface.

4. The tilt and swivel positioning device according to claim 1, further comprising:
    at least two pull elements connected to the tilt element, wherein said pull elements linearly slide in an opposite direction for swivelling the tilt element about the bearing element.

5. The tilt and swivel positioning device according to claim 4, further comprising push elements (21, 31) arranged on said pull elements (20,30).

6. The tilt and swivel positioning device according to claim 5, wherein each of said push elements (21, 31) swivel about the tilt element (10).

7. The tilt and swivel positioning device according to claim 5, wherein
    said push elements (21, 31) comprises a convex roll-off surface (61, 62) resting against a concave roll-off surface (51, 52) for swivelling movement; and wherein the radius of said concave roll-off surface (51, 52) exceeds the radius of the corresponding convex roll-off surface (61, 62).

8. The tilt and swivel positioning device according to claim 5, wherein said push elements (21, 31) comprise the convex roll-off surfaces (61, 62) and the tilt element (10) comprises the concave roll-off surfaces (51, 52) for swivellable bearing arrangement of the push elements (21, 31) at the tilt element (10).

9. The tilt and swivel positioning device according to claim 5, wherein said push elements (21, 31) comprise said concave roll-off surfaces and the tilt element (10) comprises said convex roll-off surfaces for swivelling said push elements (21, 31) at the tilt element (10).

10. The tilt and swivel positioning device according to claim 1, wherein the convex roll-off surface and the corresponding concave roll-off surface are cylindrical along axes (a1, a2, a3) and are parallel in relation to each other.

11. The tilt and swivel positioning device according to claim 1, wherein said roll-off surfaces (50, 51, 52; 60, 61, 62) are wear resistant.

12. The tilt and swivel positioning device according to claim 1, wherein the roll-off surfaces have low-friction properties.

13. The tilt and swivel positioning device according to claim 4, wherein said pull elements (20, 30) penetrate the tilt element (10) at openings (25, 35).

14. The tilt and swivel positioning device according to claim 4, wherein at least one of said pull elements is coupled to an actuator (100, 110).

15. The tilt and swivel positioning device according to claim 14, wherein said actuator is a piezoelectric ceramic element.

* * * * *